(12) United States Patent
Mueller

(10) Patent No.: US 6,293,557 B1
(45) Date of Patent: Sep. 25, 2001

(54) DISPOSABLE SEAL SYSTEM

(75) Inventor: Peter Michael Mueller, Suwanee, GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/383,716

(22) Filed: Aug. 26, 1999

(51) Int. Cl.[7] .................................................. F16J 15/32
(52) U.S. Cl. ..................... 277/551; 277/576; 277/577; 277/622; 277/627
(58) Field of Search ..................................... 277/551, 555, 277/603, 616, 621, 622, 623, 624, 626, 627, 635, 637, 644, 650, 572, 576, 577; 285/302, 110, 275, 281

(56) References Cited

U.S. PATENT DOCUMENTS

| | | | |
|---|---|---|---|
| 3,807,773 | * | 4/1974 | Brune ........................................ 285/52 |
| 3,900,938 | * | 8/1975 | Blomgren, Sr. et al. .............. 29/240 |
| 4,217,027 | | 8/1980 | MacChesney et al. . |
| 4,971,614 | * | 11/1990 | D'Annessa et al. ................... 65/3.12 |
| 5,445,052 | * | 8/1995 | Nichols, Jr. ............................. 82/152 |
| 5,503,438 | * | 4/1996 | Swauger ............................. 285/332.2 |

* cited by examiner

Primary Examiner—Anthony Knight
Assistant Examiner—Albon K. Pickard
(74) Attorney, Agent, or Firm—Thomas, Kayden, Horstemeyer & Risley LLP

(57) ABSTRACT

A sealing system for use in a chemical or gaseous delivery system has a delivery tube connected to a source of the material to be delivered and which intrudes into the revolving region where the material is to go. The sealing system has a secondary sealing nut affixed to the delivery end of the tube, and a primary sealing nut mounted on the secondary nut with a sealing member therebetween. When the region revolves, the two nuts are automatically tightened to hold the sealing member in firm and positive engagement with the housing surrounding the region.

20 Claims, 5 Drawing Sheets

DISPOSABLE SEAL SYSTEM

RELATED APPLICATIONS

This invention is related to that shown in U.S. patent application Ser. No. 09/353,943 of Mueller et al., filed Jul. 15, 1999, and to U.S. patent application Ser. No. 9/383,780 of Mueller filed concurrently herewith.

FIELD OF THE INVENTION

This invention relates to a sealing apparatus for chemical delivery systems and, more particularly to the process of introducing materials into the interior of tubular members, such as glass starter tubes used in making optical fiber pre-forms.

BACKGROUND OF THE INVENTION

While the following discussion deals with starter tubes and sealing arrangements for optical fiber pre-forms, it is to be understood that principles of the present invention are applicable to other, different applications involving, generally, chemical delivery systems. For example, the sealing arrangement of the invention is usable with the starter tube sealed vacuum system for collapsing the tube into the desired pre-form, as is shown in the aforementioned Mueller et al. application.

Optical fiber of the type used to carry optical signals is fabricated typically by heating and drawing a portion of an optical pre-form comprising a refractive core surrounded by a protective glass cladding. Presently, there are several known processes for fabricating pre-forms. The modified chemical vapor disposition (MCVD) process, which is described in U.S. Pat. No. 4,217,027 issued in the names of J. B. MacChensey et al. on Aug. 12, 1980 and assigned to Bell Laboratories, Inc. has been found to be one of the most useful because the process enables large scale production of pre-forms which yield very low loss optical fiber.

During the fabrication of pre-forms by the MCVD process, reactant-containing gases, such as $SiCL_4$ are passed through a rotating substrate tube which is made of silica glass. A torch heats the tube from the outside as the precursor gases are passed therethrough, causing deposition of submicron-sized glass particles on the inside surface of the tube. The torch is moved along the longitudinal axis of the tube in a plurality of passes to build up layer upon layer of glass to provide a pre-form tube. Once a sufficient number of layers have been deposited, the pre-form tube is then heated to cause it to be collapsed to yield a pre-form or pre-form rod as it is often called. The delivery system of the reactant gases to the starter tube interior is generally through a fixed metallic hollow tube connected to the source or sources of the gases. It is necessary that the space between the exterior surface of the delivery tube and the interior surface of the glass starter tube be sealed so that the critical gases do not leak out of the starter tube.

In the current method of manufacture, the apparatus which ensures sealed delivery of the deposition chemicals in the gases is a combination of a rotary union element, a structure for holding and sealing the starter tube, and a secondary face seal assembly for routing of purge gases through the structure. This is a complex apparatus that requires frequent maintenance. Existing systems also have the disadvantage of having inherently larger cavities for the accumulation of dead zones of flow, and a tendency to create particle contamination from the rotary union and face seal system. Inasmuch as the chemical delivery system is stationary, the current means of achieving delivery is via the rotary union, featuring a transition of the chemicals from a stationary pipe to a rotary pipe or to the inside of a supply coupling. The chemicals being delivered are at a pressure greater than atmospheric, and the face seal properties are the only restriction to the release of the chemicals to the atmosphere. The rotary union and secondary face seals generate a large quantity of particles from wear, and contribute to the contamination of the coupling. As the seals wear down, excessive leakage occurs both to the atmosphere and into the product (starter tube), resulting in lost product and requiring system maintenance. The complexity of the components involved requires skilled maintenance being performed using requalification through test of the system. Both material and labor costs are, consequently, high.

SUMMARY OF THE INVENTION

The present invention embodies an inventive sealing arrangement for introducing chemicals into the starter tube.

In more detail, the chemicals usually in the form of gases, are delivered into the starter tube by means of a stationary piping system. The rotary union is dispensed with and the delivery tube intruded into the interior of the starter tube. A stationary seal mounting member or hub is attached to the distal, open end of the delivery tube, preferably being threaded thereon, and forms the seal mounting point. A sealing member, sized to fit within the interior of the starter tube and forming a seal with the interior wall thereof is placed on the mounting member and secured thereto by a self-tightening fastener which is threaded onto the hub. The seal between the atmosphere and the interior of the starter tube is maintained by the physical properties of the seal and the deformation of the seal on the mounting member caused by the fastener. In operation, the seal fastener is constantly tightened by the rotation of the starter tube which, in turn, due to the friction between the seal and the inner wall of the starter tube, applies to the seal a torque which is transmitted to the seal fastener, causing it to be continuously tightened. The only wear surface is the contact between the seal and the inside wall of the glass starter tube, which is relatively minor in nature. Any particles generated by this interface wear tend to migrate to the atmosphere instead of into the glass tube inasmuch as the chemical gas pressure within the glass tube is greater than atmospheric. When wear does reach the point that the doping operation is compromised, the seal fastener is unscrewed and the seal discarded, to be replaced by a new seal.

In a second embodiment of the invention, the seal and fastener are combined into a single unit, which can be made completely of the seal material, such as Teflon® for example, and the entire unit discarded when leakage or wear becomes a problem. The mounting hub can be made integral with the end of the delivery tube and threaded to receive the fastener or the combined seal and fastener.

In still another embodiment of the invention, the seal can be made integral with the hub which is threaded to receive the fastener. In this case, the hub is threaded onto the end of the delivery tube, and the end is threaded to receive the fastener.

The numerous features and advantages of the present invention will be clearly presented in the following detailed description, read in conjunction with the accompanying drawings.

DETAILED DESCRIPTION

In the fabrication of the pre-form for drawing clad glass fibers, generally, gas plane precursor reactants together with oxygen are introduced into a glass tube, i.e., a starter tube, in a constantly moving stream. The tube and its contents are heated to a homogenous reaction temperature within a moving hot zone produced by a moving heating element which continuously traverses the outside surface of the tube. Homogeneously produced glass particles, commonly called "soot" collect on the tube walls, and are fused into a continuous layer within the moving hot zone. In the modified vapor deposition (MCVD) process shown and described in the aforementioned MacChesney et al U.S. Pat. No. 4,217,027, the tube is continuously rotated about its longitudinal axis.

Figure 1:
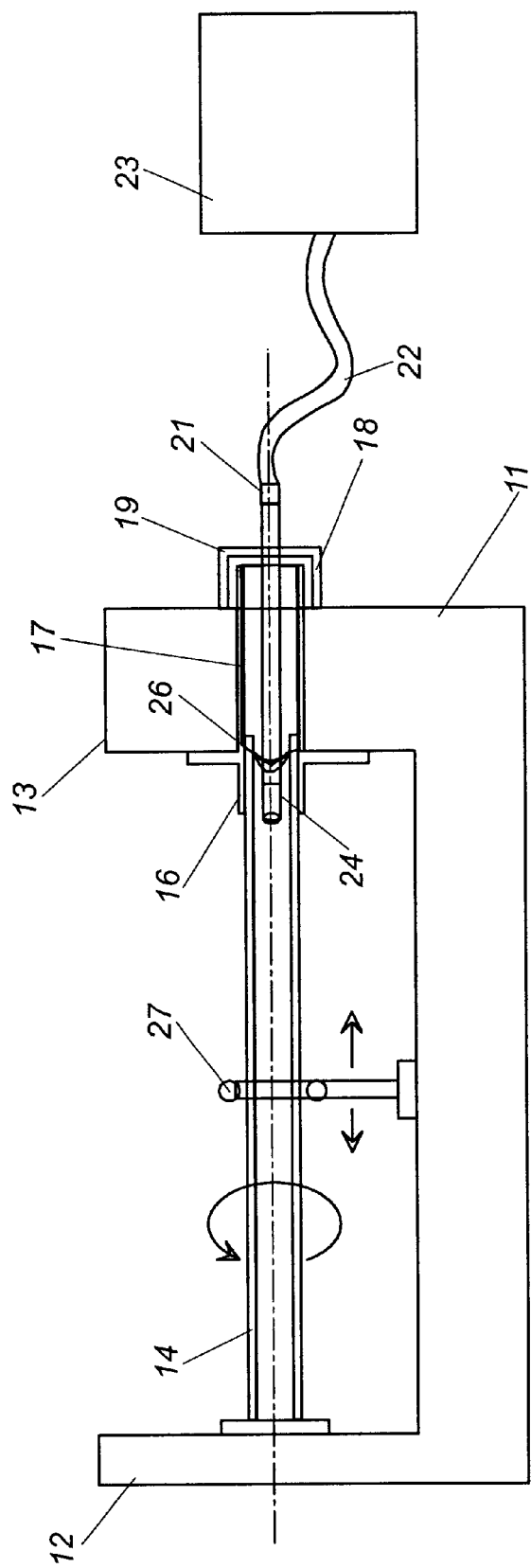
FIG. 1 is a diagrammatic view of the apparatus for introducing gaseous elements into a starter tube and using the sealing arrangement of the present invention.

FIG. 1 is a diagrammatic view of the apparatus for preparing preforms as just discussed, and showing the sealing arrangement of the present invention. A lathe 11 has axially disposed between a tailstock 12 and a headstock 13 a starter tube 14. Tube 14 is mounted in an arbor 16 having a cylindrical or hollow shaft 17 and which is driven by means not shown, but generally contained within the headstock, to rotate tube 14 in the direction of the arrow. It is to be understood that rotation may be clockwise or counter-clockwise. For the following discussion, it will be assumed that the direction of rotation is counter-clockwise as viewed from tailstock 12 toward headstock 13. Within the arbor shaft 17 is a stationary delivery tube 18, the stationary mounting arrangement for the tube being shown diagrammatically as mounting element 19, which may take any of a number of forms. Delivery tube 18 is shown with a protruding end 21 which is coupled by a conduit 22 to a source 23 of the gaseous materials. Tube 18 intrudes into the end of starter tube 14 and has, at its intruding end 24 the sealing arrangement 26 of the invention, to be discussed more fully hereinafter. Sealing arrangement 26 is, in accordance with the invention, self tightening, i.e., as tube 14 rotates, it tightens the sealing arrangement 26 to insure maintenance of a seal with tube 14 that prevents the gases in tube 14 from leaking out. A heat or flame source 27 is movably mounted within lathe 11 for back-and-forth traversal of the length of tube 14, as discussed hereinbefore, and as indicated by the arrows.

Figure 2:
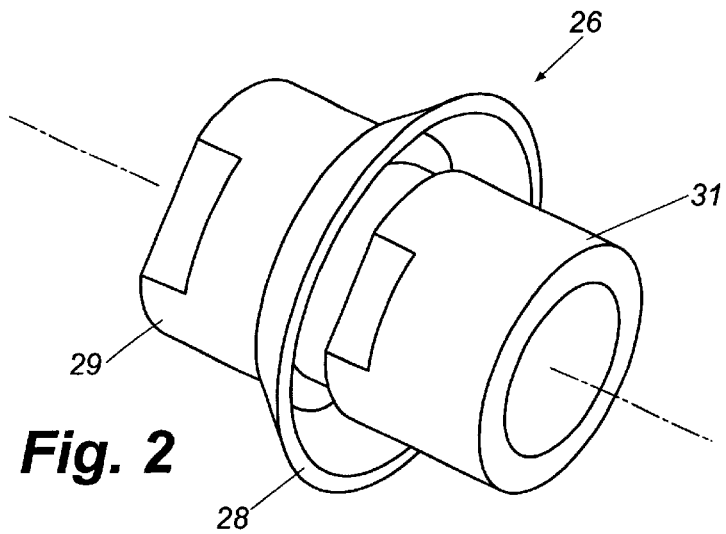
FIG. 2 is a perspective view of the seal forming elements of the present invention as assembled.

FIG. 2 is a perspective view of the self-tightening sealing arrangement 26 of the invention in one embodiment thereof, and FIGS. 3 through 8 are detailed views of the basic components thereof. As shown in FIG. 2, the sealing arrangement 26 comprises three basic parts: a conically shaped sealing member 28 which is made of any of a number of suitable materials characterized by long wear and flexibility. Such materials can be, for example, hard rubber, various plastics or material such as Teflon®, which has been found to make excellent seals. Sealing member 28 is clamped between a primary sealing nut 29 and a secondary sealing nut 31 which is mounted onto the intrusive end 24 of delivery tube 18, by any of a number of suitable means. As shown in the figures, the secondary nut is threaded for mounting on the delivery tube 18. However, other mounting arrangements are possible, such as a bayonet lock, or nut 31 may be a press fit on the end of delivery tube 18. In the case of threads or bayonet lock, the direction of rotation of nut 31 for tightening is the same direction of rotation as starter tube 14. In a similar manner, primary nut 29 is mounted to secondary nut 31 by threads or, for example, bayonet lock, with the tightening direction of rotation being the same as the direction of rotation of starter tube 14. When primary nut 29 is mounted on secondary nut 31, sealing member 28 is captured therebetween and held firmly in place with the nuts 29 and 31 being continuously subjected to tightening torque.

In operation, the sealing member 28 which is stationary bears against the interior wall of starter tube 14, which is rotating. Thus, the friction between the two tends to impart a torque to the member 28 in a counter-clockwise direction, when the rotation is as shown in FIG. 1. Thus, both nuts 29 and 31 are subjected to the same torque in that they grip member 28 tightly. This torque is in the direction to tighten nut 31 on tube 18, and to tighten nut 29 on nut 31. Hence, there is no danger of the sealing arrangement 26 working loose during operation.

Figure 3:
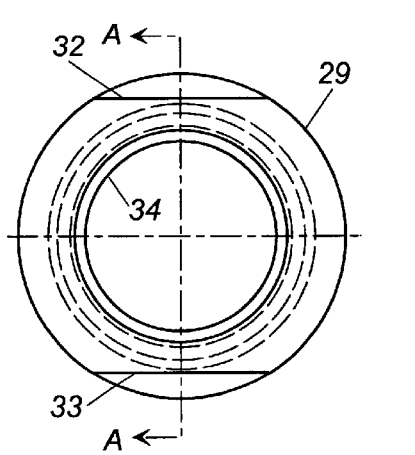
FIG. 3 is a front elevation view of the primary sealing nut of the invention.
Figure 4:
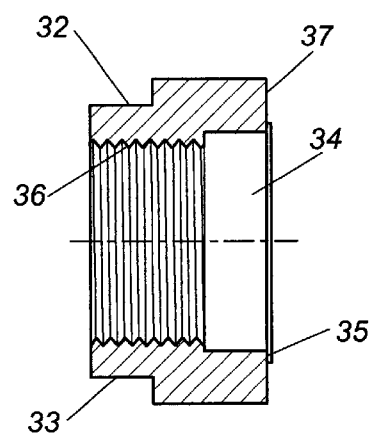
FIG. 4 is a cross-sectional view along the line A—A of FIG. 3.
Figure 8:
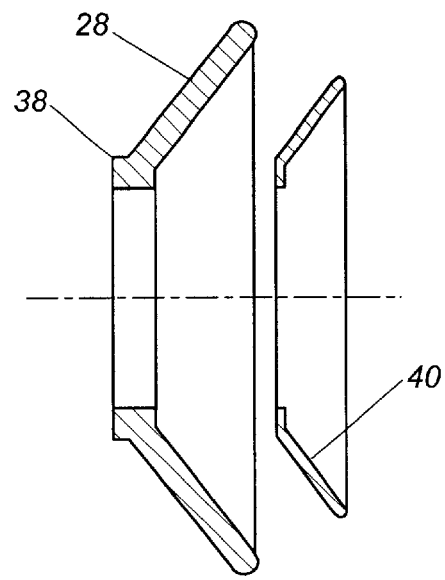
FIG. 8 is a cross-sectional view of the sealing member of the invention and of an optional resilient member for augmenting the resilient sealing members action.

FIG. 3 is a front elevation view of primary seal nut 29 and FIG. 4 is a cross-section thereof along the line A—A of FIG. 3. Nut 29, which may be made of stainless steel, for example, plastic, or the same material as sealing member 28 has a pair of flats 32,33 on the exterior thereof for initially tightening nut 29 on nut 31 and has an interior bore 34 extending therethrough to allow passage of the gaseous mixture into starter tube 14. As seen in FIG. 4, a portion 36 of the length of the bore 34 is threaded for mounting nut 29 onto nut 31. As pointed out hereinbefore, means other than threads may be used for mounting nut 29 provided that the direction of rotation for tightening corresponds to the direction of rotation of the starter tube 14. In the case of the threads 36 shown in FIG. 4, and the counter-clockwise direction of rotation of the tube 14, the threads 36 will be lefthanded threads. The rear shoulder 37 of nut 29 bears against the hub 38 of conical sealing member 28, which is shown in cross-section in FIG. 8. On the rear shoulder 37 is a circular ridge 35 which, when forced against the hub 38 of sealing member 28, tends to distort it slightly, which in turn causes some expansion of the diameter of the outer edge of the seal and increases the sealing effect. Other configurations, such as radial ridges might also be used. Also shown in FIG. 8 is a conical resilient member 40, which may be a leaf spring which applies restoring force to member 28.

Figure 5:
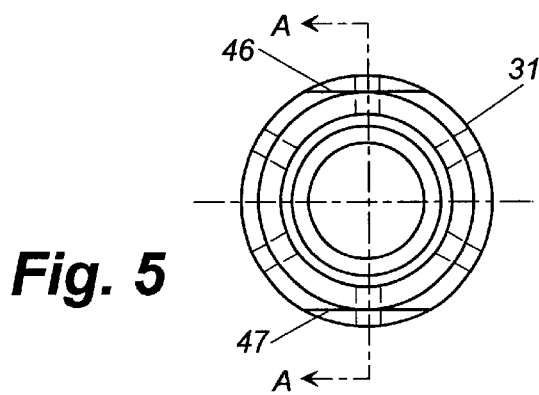
FIG. 5 is a front elevation view of the secondary sealing nut of the invention.
Figure 6:
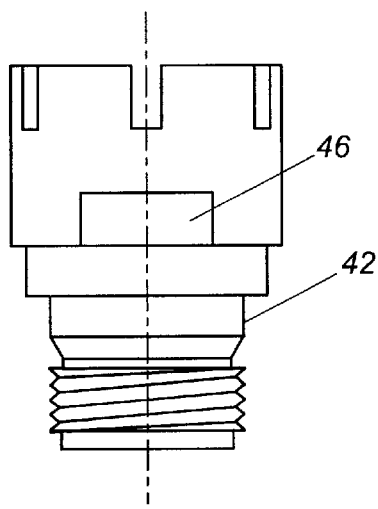
FIG. 6 is a plan view of the secondary sealing nut of FIG. 5.
Figure 7:
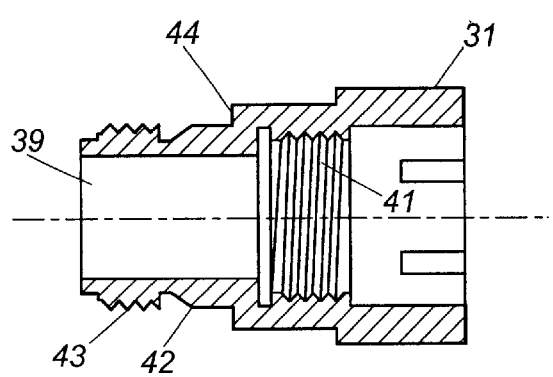
FIG. 7 is a cross-sectional view along the line A—A of FIG. 5.

FIG. 5 is a front elevation view of the secondary sealing nut 31, FIG. 6 is a plan view thereof, and FIG. 7 is a cross-sectional thereof along the line A—A of FIG. 5. Nut 31 has an axial bore 39 extending therethrough with a threaded portion 41 intermediate the ends of nut 31 for mounting the nut 31 on the end of the delivery tube 18. As is the case with nut 29, other mounting means, including but not limited to bayonet lock or press fit, may be used, so long as the aforementioned torque from sealing member 28 is in the direction to tighten nut 31 or tube 18. Nut 31 also has an extended portion 42 having threads 43 on the outside thereof for receiving nut 29. The rear of hub 38 of sealing member 28 butts up against a shoulder 44 formed on portion 42 so that sealing member 28 is sandwiched between the two nuts 29 and 31.

As is the case with nut 29, nut 31 has a pair of flats 46 and 47 to facilitate initial tightening of the nut.

Figure 9:
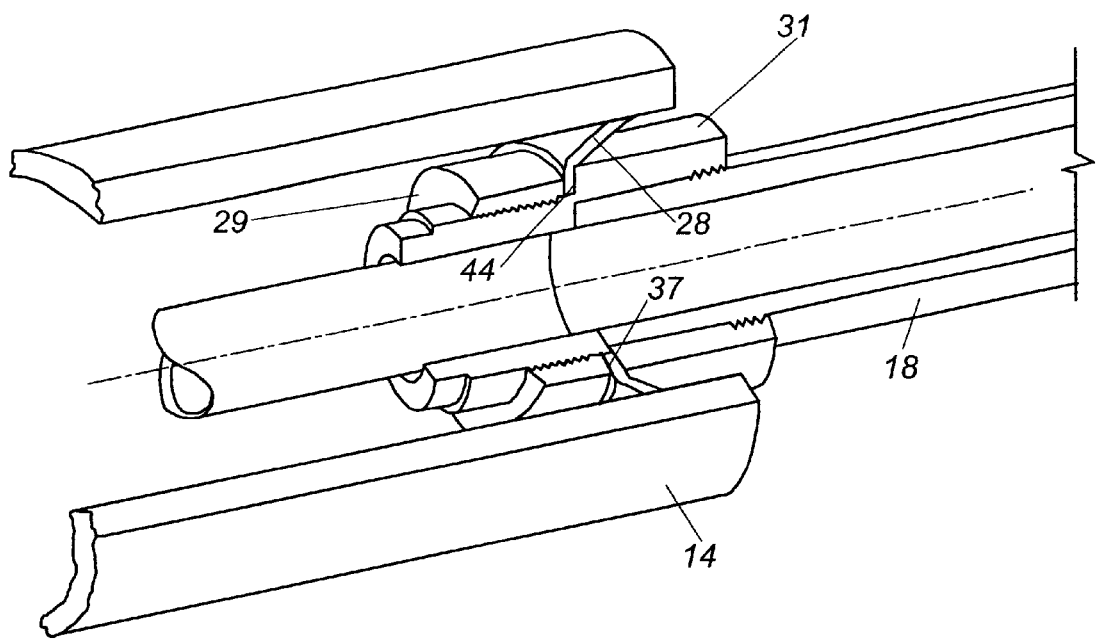
FIG. 9 is a perspective, partially sectional view of a first embodiment of the invention.

The elements of the sealing arrangement 26 as depicted in FIGS. 3 through 8 are shown assembled and in use in FIG. 9, which is a perspective, partially sectional view of the assembly in a first embodiment of the invention. It can be seen that the conical sealing member 28 is sandwiched between the shoulders 37 and 44 of nuts 29 and 31 respectively, as discussed hereinbefore. It can also be seen that sealing member 28 is slightly deformed where it contacts the inner surface of the starter tube 14. As pointed out hereinbefore, as tube 14 rotates, nuts 29 and 31 are tightened, thereby squeezing sealing member 28 therebetween. As member 28 is so squeezed, it tends to flatten slightly, thereby increasing its diameter and insuring sealing contact with the inner wall of tube 14.

During prolonged use, there will naturally be some wear of the periphery of member 28 inasmuch as it remains stationary while tube 14 revolves. The squeezing action will act to some extent to prolong the sealing action, but, eventually, member 28 will have to be discarded and replaced. Because of the extremely simple construction of the sealing arrangement, replacing member 28 can be accomplished in a matter of minutes.

Figure 10:
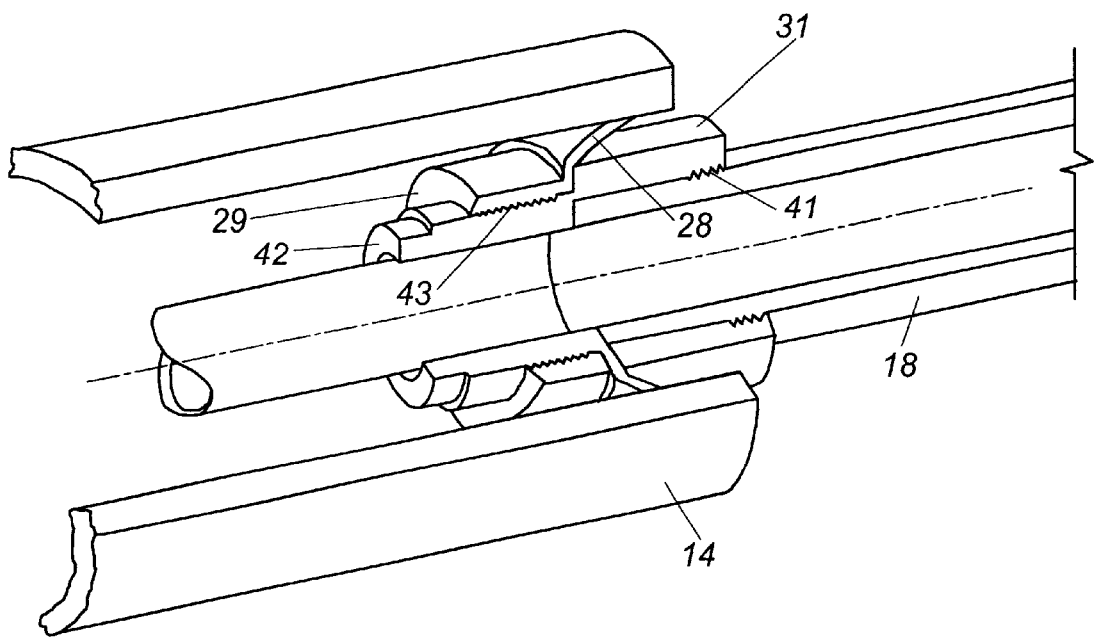
FIG. 10 is a perspective, partially sectional view of a second embodiment of the invention.

FIG. 10 is a perspective, partially sectional view of a second embodiment of the invention wherein nut 29 and sealing member 28 are made of the same material and are integral with each other. As pointed out hereinbefore, Teflon® is an excellent material for use in such a construction, having excellent sealing properties and strength. When wear of member 28 requires replacement, the entire nut 29 sealing member 28 integral combination can be quickly removed and discarded, and a new nut 29 with integral sealing member 28 mounted onto secondary nut 31.

Figure 11:
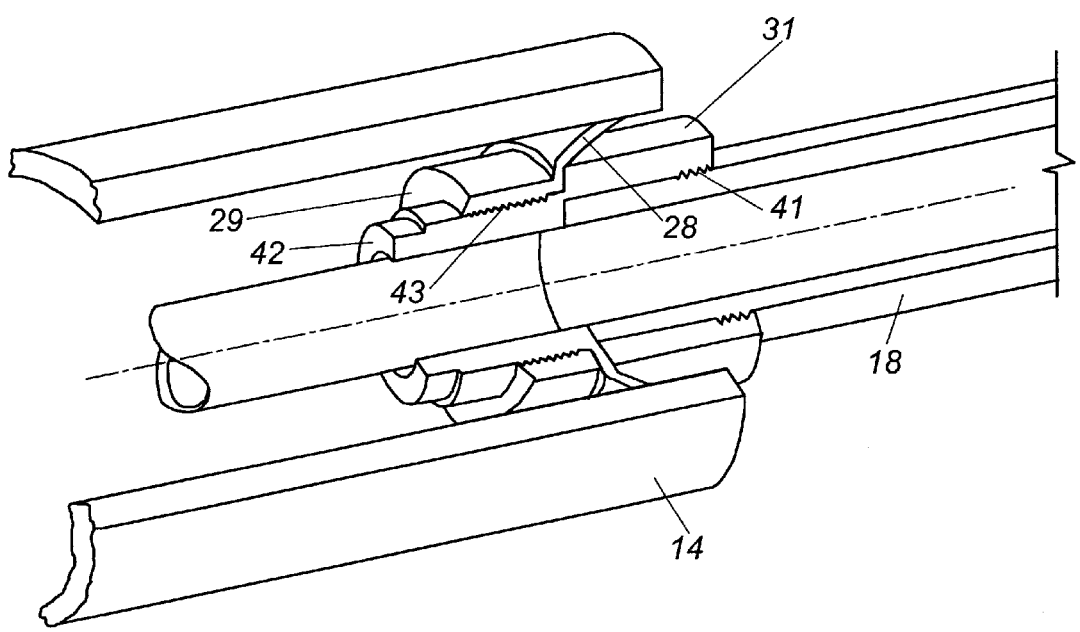
FIG. 11 is a perspective, partially sectional view of another embodiment of the invention.

FIG. 11 is a view similar to those of FIGS. 9 and 10 of still anther embodiment of the invention, wherein sealing member 28 and secondary nut 31 are made of the same material, e.g., Teflon® and are integral with each other. In this case replacement of the sealing member 28 requires removal of nut 29 before nut 31 can be removed and discarded. Also, in this embodiment, it is not desirable for nut 31 to be a press fit on tube 18 inasmuch as removal would be too difficult.

The invention, by virtue of the seal and nest arrangement being self tightening in operation, is extremely simple and economical compared to prior art arrangements and the seal is quickly and easily replaced. Because the parts are simple, discarding one or more of them in case of excessive wear or leaks due to other causes, is a minor economic factor. The added complications of rotary union and two or more sealing arrangements are dispensed with.

The invention has been shown and described as it is used with an apparatus for delivering gas mixtures to optical fiber starter tubes. It should be readily apparent that the invention is amenable to a wide variety of air, gas, or chemical delivery systems wherein sealing is an important factor. Because the sealing member itself is readily replaceable, and can be sized to fit a wide range of internal diameters, the adaptability of the arrangement of the invention to other types of delivery systems is unique.

In conclusion, it should be noted that it will be obvious to those skilled in the art that many variations and modifications may be made to the preferred embodiment or embodiments without departure from the principles of the present invention. For example, whenever threads or bayonet locks are used, it might be feasible to use O-rings to enhance the sealing. All such variations and modifications are intended to be included herein as being within the scope of the present invention. Further, in the claims hereafter, the corresponding structures, materials, acts, and equivalents of all means or step plus function elements are intended to include any structure, material, or acts for performing the functions with other specifically claimed elements.

What is claimed is:

1. For use in a chemical delivery system having a stationary delivery tube for delivering chemicals to a rotating tubular member, having an inner wall, a sealing arrangement for sealing the tubular member to prevent chemical leakage, the delivery tube having a first end that intrudes into the tubular member, said sealing arrangement comprising:

a secondary nut member adapted to be mounted on the first end of the delivery tube in fixed position, said secondary nut having an extended portion;

a stationary sealing member having a diameter such that it is adapted to make sealing engagement with the inner wall of the rotating tubular member;

a primary nut member for mounting on said extended portion of said secondary nut for maintaining said sealing member in a fixed position relative to the rotating tubular member;

said primary nut having a direction of rotation for tightening it on said extended portion of said secondary nut member wherein the direction of rotation is the same as the direction of rotation of said rotating tubular member.

2. A sealing arrangement as claimed in claim 1 wherein said secondary nut member is affixed to said first end of delivery tube by rotation with respect thereto, wherein the direction of rotation is the same as the direction of rotation of the rotating tubular member.

3. A sealing arrangement as claimed in claim 1 wherein said extended portion has external threads thereon and said primary nut has a bore extending therethrough having internal threads along at least one portion thereof for mating with the threads on said extended portion.

4. A sealing arrangement as claimed in claim 3 wherein said sealing member has a hub portion adapted to be captured between said primary nut and said secondary nut.

5. A sealing arrangement as claimed in claim 3 wherein the tightening direction of rotation of said primary nut on said secondary nut is the same direction of rotation as that of the rotating tubular member.

6. A sealing arrangement as claimed in claim 5, wherein said threads are left-handed threads.

7. A sealing arrangement as claimed in claim 1 and further including a resilient member for applying a restoring force to said sealing member.

8. A sealing arrangement as claimed in claim 1 wherein said sealing member is integral with said primary nut.

9. A sealing arrangement as claimed in claim 8 wherein said sealing member and said primary nut are made of the same material.

10. A sealing arrangement as claimed in claim 9 wherein said material is Teflon®.

11. A sealing arrangement as claimed in claim 1 wherein said sealing member is integral with said secondary nut member.

12. A sealing arrangement as claimed in claim 11 wherein said sealing member and said secondary nut member are made of the same material.

13. A sealing arrangement as claimed in claim 12 wherein said material is Teflon®.

14. For use in a chemical delivery system having a delivery tube for delivering chemicals to a rotating tubular member, a sealing arrangement for sealing the tubular member to prevent chemical leakage, the delivery tube having a first end that intrudes into the tubular member, said sealing arrangement comprising:

a secondary nut member having an extended portion, said secondary nut member being adapted for mounting on the first end of the delivery tube in fixed position;

a sealing member having a diameter such that it is adapted to make sealing engagement with the inner wall of the rotating tubular member;

a primary nut for maintaining said sealing member in fixed position;

said extended portion having external threads thereon and said primary nut having a bore extending therethrough having internal threads along at least one portion thereof for mating with the threads on said extended portion, said primary nut having a direction of rotation for tightening it on said extended portion wherein the direction of rotation is the same as the direction of rotation of the rotating tubular member;

said sealing member having a hub portion adapted to be captured between said primary nut and said secondary nut; and said primary nut having a shoulder adapted to bear against said hub portion, said shoulder having a circular ridge thereon for applying a distorting force to said sealing member.

15. For use in a chemical delivery system having a delivery tube for delivering chemicals to a rotating tubular member, a sealing arrangement for sealing the tubular member to prevent chemical leakage, the delivery tube having a first end that intrudes into the tubular member, said sealing arrangement comprising:

a secondary nut member having an extended portion, said secondary nut member being adapted for mounting on the delivery tube in fixed position to the first end of said delivery tube by rotation with respect thereto, said secondary nut having a bore extending therethrough having internal threads over at least a portion of the length of said bore to form mating threads with external threads on the delivery tube, the direction of rotation of said secondary nut member being the same as the direction of rotation of the rotating tubular member;

a sealing member having a diameter such that it is adapted to make sealing engagement with the inner wall of the rotating tubular member; and a primary nut for mounting on said extended portion of said secondary nut member for maintaining said sealing member in fixed position, said primary nut having a direction of rotation for tightening it on said extended portion wherein the direction of rotation is the same as the direction of rotation of the tubular rotating member.

16. A sealing arrangement as claimed in claim 15 wherein said mating threads are left-handed threads for tightening said secondary nut on said delivery tube.

17. A material delivery system for delivering material to a rotating tubular member, said delivery system comprising:

a stationary delivery tube substantially axially aligned with the rotating tubular member, said delivery tube having a first end for connection to a stationary source of the material and a second end which intrudes into the rotating tubular member;

a sealing member having a diameter such that it is adapted to make sealing engagement with the inner wall of the rotating tubular member;

a first holding member for said sealing member affixed to the second end of said delivery tube for affixing said sealing member thereto, said holding member having an extended portion; and a second holding member mounted on said extended portion for maintaining said sealing member in fixed position on said stationary delivery tube.

18. A material delivery system as claimed in claim 17 wherein said extended portion has external threads thereon and said second holding member comprises a nut having a bore extending therethrough having internal threads along at least a portion thereof for mating with the threads on said extending portion.

19. A material delivery system as claimed in claim 17 wherein said first holding member is affixed to said second end of said delivery tube by means of a press fit thereon.

20. A material delivery system as claimed in claim 17 wherein the material to be delivered is a reactant containing gas.

* * * * *